(12) United States Patent
Perozziello et al.

(10) Patent No.: US 9,127,783 B2
(45) Date of Patent: Sep. 8, 2015

(54) MICRO-FLUIDIC SYSTEM

(75) Inventors: Gerardo Perozziello, Bologna (IT);
Giuseppe Sardella, Lipari (IT); Gianni Medoro, Casalecchio di Reno (IT); Alex Calanca, Bologna (IT); Nicolò Manaresi, Bologna (IT)

(73) Assignee: SILICON BIOSYSTEMS S.P.A., Bologna (IT)

( * ) Notice: Subject to any disclaimer, the term of this patent is extended or adjusted under 35 U.S.C. 154(b) by 8 days.

(21) Appl. No.: 13/515,959

(22) PCT Filed: Dec. 16, 2010

(86) PCT No.: PCT/IB2010/003277
§ 371 (c)(1),
(2), (4) Date: Sep. 14, 2012

(87) PCT Pub. No.: WO2011/073782
PCT Pub. Date: Jun. 23, 2011

(65) Prior Publication Data
US 2013/0045144 A1 Feb. 21, 2013

(30) Foreign Application Priority Data
Dec. 17, 2009 (IT) .............................. BO2009A0806

(51) Int. Cl.
*B01L 3/00* (2006.01)
*F15C 3/00* (2006.01)
(Continued)

(52) U.S. Cl.
CPC ......... *F16K 99/0001* (2013.01); *F16K 99/0015* (2013.01); *F16K 99/0059* (2013.01); *B01L 3/0265* (2013.01); *B01L 3/50273* (2013.01); *B01L 3/502738* (2013.01); *B01L 2300/0887* (2013.01); *B01L 2300/14* (2013.01); *B01L 2400/0481* (2013.01);
(Continued)

(58) Field of Classification Search
USPC ................. 422/68.1, 417, 502, 503, 537; 251/129.06
See application file for complete search history.

(56) References Cited

U.S. PATENT DOCUMENTS 5,593,130 A * 1/1997 Hansson et al. ............. 251/61.1
6,626,417 B2 * 9/2003 Winger et al. ........... 251/129.06
(Continued)

FOREIGN PATENT DOCUMENTS

DE 4422944 1/1996
DE 4223067 8/1997
(Continued)

OTHER PUBLICATIONS

Huff et al., Flow characteristics of a pressure-balanced microvalve, 7th International Conference on Solid-State Sensors and Actuators, pp. 98-101 (1993).
(Continued)

*Primary Examiner* — Jennifer Wecker
(74) *Attorney, Agent, or Firm* — Marshall, Gerstein & Borun LLP (57) ABSTRACT

A micro-fluidic system comprising a micro-fluidic channel, which has a wall provided with a hole, within which a closing portion of a closing element extends; when the closing portion is arranged within the micro-fluidic channel, the passage of the liquid along the channel is interrupted; by deforming the closing element by suction the closing portion may be lifted and therefore allow the passage of liquid along the micro-fluidic channel.

29 Claims, 5 Drawing Sheets

(51) Int. Cl.
  *F15C 3/04*    (2006.01)
  *F16K 99/00*   (2006.01)
  *F16L 41/00*   (2006.01)
  *F16K 7/12*    (2006.01)
  *B01L 3/02*    (2006.01)
  *F16K 7/14*    (2006.01)
  *F16K 7/17*    (2006.01)
  *B29L 31/00*   (2006.01)

(52) U.S. Cl.
  CPC . *B01L 2400/0487* (2013.01); *B01L 2400/0638* (2013.01); *B29L 2031/7506* (2013.01); *F15C 3/04* (2013.01); *F16K 7/123* (2013.01); *F16K 7/126* (2013.01); *F16K 7/14* (2013.01); *F16K 7/17* (2013.01); *F16K 99/0034* (2013.01); *F16K 2099/0074* (2013.01); *F16K 2099/0078* (2013.01); *F16K 2099/0084* (2013.01)

(56) References Cited

U.S. PATENT DOCUMENTS

| | | |
|---|---|---|
| 2002/0117643 A1 | 8/2002 | Winger et al. |
| 2004/0036047 A1* | 2/2004 | Richter .................. 251/129.06 |
| 2004/0209354 A1* | 10/2004 | Mathies et al. ............ 435/287.2 |
| 2005/0224351 A1 | 10/2005 | Unger et al. |
| 2005/0266582 A1* | 12/2005 | Modlin et al. ................. 436/164 |
| 2007/0200081 A1* | 8/2007 | Elizarov et al. ............... 251/331 |
| 2010/0303687 A1* | 12/2010 | Blaga et al. .................... 422/504 |
| 2011/0305607 A1* | 12/2011 | Jung et al. ..................... 422/502 |
| 2012/0184010 A1 | 7/2012 | Medoro et al. |

FOREIGN PATENT DOCUMENTS

| | | |
|---|---|---|
| DE | 19949912 A1 * | 5/2001 |
| DE | 19949912 | 2/2003 |
| EP | 0546427 | 4/1995 |
| EP | 1905514 | 4/2008 |
| EP | 1905514 A1 * | 4/2008 |
| EP | 2408561 | 1/2012 |
| WO | WO-9917749 | 4/1999 |
| WO | WO-2004/061085 | 7/2004 |
| WO | WO-2008/115626 | 11/2008 |

OTHER PUBLICATIONS

International Search Report and Written Opinion for corresponding international application No. PCT/IB2010/003277, mailing date Apr. 11, 2011.

International Preliminary Report on Patentability for corresponding international application No. PCT/IB2010/003277, dated Jun. 19, 2012.

\* cited by examiner

MICRO-FLUIDIC SYSTEM

CROSS-REFERENCE TO RELATED APPLICATIONS

This application is the U.S. national phase of International Application No. PCT/IB2010/003277, filed Dec. 16, 2010, which claims the benefit of Italian Patent Application No. BO2009A 000806, filed Dec. 17, 2009.

TECHNICAL FIELD

The present invention relates to a microfluidic system.

BACKGROUND ART

In the micro-fluidic field there is known a type of system comprising a channel, which includes two segments connected to one another by a valve. The valve usually includes a partition arranged along the channel to separate the two segments and a membrane of an elastomeric material connected to a wall of the channel in the area of two holes, each of which is arranged at an end of a respective segment in the area of the partition. The valve further comprises a pneumatic actuator, which is adapted: on one side, to create a depression so as to deform the valve and, therefore, connect the two segments of the channel; on the other side, to exert a pressure to push the membrane against the wall of the channel so as to close the two holes and isolate the two segments.

Known valves and circuits of the above indicated type are for example disclosed in WO2008115626 (see in particular FIG. 2) and have different drawbacks.

A first series of drawbacks derives from the fact that the pneumatic actuator needs to always be active (both when the valve is to be opened, and when the valve is to be closed). This determines a high energy consumption and a considerable wear. It should also be noted that pneumatic actuators having the suitable size to create both a depression and a compression are relatively complex and expensive.

Furthermore, it should be noted that the preparation of this type of valves is often complex. Some of the problems in this regard are due to the fact that the membrane must often be selectively connected to the wall of the channel and not to the partition.

DE19949912 discloses especially complex micro-fluidic systems comprising channels the geometrical structures of which is complicated and difficult to implement. It should further be noted that the closing element of FIGS. 4a and 4b is normally in an open position and is deformed to reach a locked position, in which fluid cannot pass through channels 12 and 11.

US2002/0117643 discloses a valve comprising a closing element which is normally in an open position and is deformed to reach a locked position, in which fluid cannot pass.

DE4422944 discloses especially complex micro-fluidic systems comprising channels the geometrical structures of which is complicated and difficult to implement. DE4422944 discloses a valve provided with a closing element which has a closing portion which is maintained outside opening 4.

DISCLOSURE OF INVENTION

It is an object of the present invention to provide a micro-fluidic system and a closing element, which allow to overcome at least partially the drawbacks of the state of the art and are at the same time easy and cost-effective to implement.

According to the present invention, there are provided a micro-fluidic system and a closing element according to the following independent claims and, preferably, according to any of the claims directly or indirectly dependent on the independent claims.

The term "immediately" means without the substantial interposition of further elements (and optionally also of empty gaps). Unless explicitly specified otherwise, in the present text the following terms have the meaning indicated hereinafter.

By equivalent diameter of a section there is intended the diameter of a circle having the same area of the section.

By section of a channel or of a duct there is intended the section substantially perpendicular to the longitudinal extension of the channel (or duct) i.e. to the feeding direction of the fluid in the channel (or duct).

By equivalent diameter of a hole there is intended the diameter of a circle having the same area as the smallest cross section of the hole.

By micro-fluidic system there is intended a system comprising at least one micro-fluidic channel and a valve arranged along the channel.

By micro-fluidic channel there is intended a channel having a section with an equivalent diameter smaller than 1 mm (in particular, smaller than 0.5 mm).

BRIEF DESCRIPTION OF THE DRAWINGS

The invention will now be described with reference to the accompanying drawings, which show non-limitative embodiments thereof, in which.

BEST MODE FOR CARRYING OUT THE INVENTION

Figure 1:
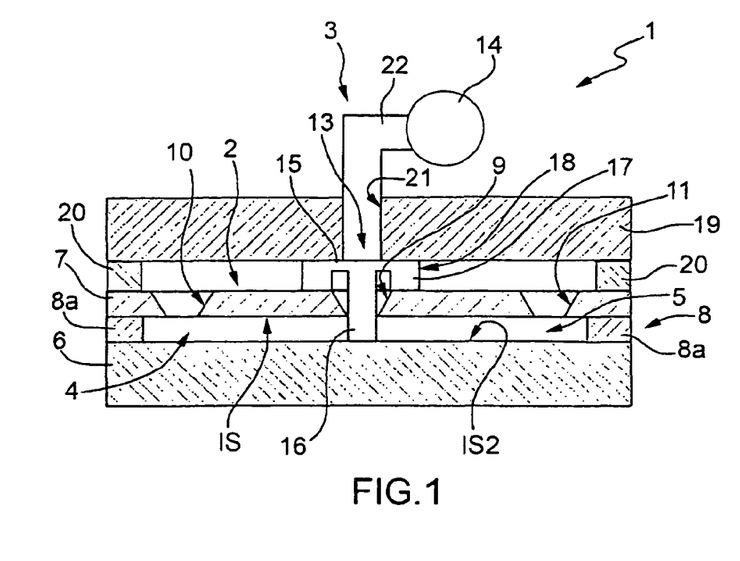
FIG. 1 is a diagrammatic cross-section of a micro-fluidic system made according to the present invention.

In FIG. 1, numeral 1 indicates as a whole a microfluidic system comprising a micro-fluidic channel 2 and a valve 3, which is adapted to adjust the transfer of fluid (in particular of liquid) from a segment 4 to a segment 5 (and/or vice versa) of channel 2.

Segments 4 and 5 are substantially coplanar to one another. In particular, channel 2 is substantially linear.

System 1 comprises a support (wall) 6; a covering (wall) 7; and a spacer element 8, which sealingly connects support 6 and covering 7 and defines channel 2 laterally and at the ends. In particular, spacer element 8 comprises two end portions 8a and two side portions 8b (partially shown in FIG. 2) which extend continuously, parallelly to the plane of the sheet of FIG. 1, on opposite sides of end portions 8a so as to sealingly connect support 6 and covering 7. Side portions 8b are transversal (in particular, substantially perpendicular) and sealingly connected to end portions 8a.

Covering 7 is a wall of channel 2. In particular, covering 7 has an inner surface IS partially delimiting channel 2 (in particular on top).

Inner surface IS extends (immediately) downstream and (immediately) upstream of valve 3 (in particular, of hole 9) so as to at least partially delimit (in particular on top) micro-fluidic channel 2 in the area of segments 4 and 5. In particular, (part of) inner surface IS present in the area of segment 4 is substantially coplanar to (part of) inner surface IS present in the area of segment 5. More specifically, surface IS is substantially coplanar to opening (to the mouth) of hole 9 facing channel 2.

Support 6 is a wall of channel 2. System 1 (in particular, support 6) comprises an inner surface IS2, which substantially faces inner surface IS. More precisely, surfaces IS and IS2 are parallel to one another.

Surface IS2 extends (immediately) downstream and (immediately) upstream of valve 3 so as to partially delimit (in particular on the bottom) micro-fluidic channel 2 in the area of segments 4 and 5. (Part of) inner surface IS2 present in the area of segment 4 is substantially coplanar to (part of) inner surface IS2 present in the area of second segment 5.

Covering 7 has a hole 9, which is arranged between segments 4 and 5; and two holes 10 and 11, which are arranged at opposite ends of channel 2 and are adapted to connect channel 2 with further ducts/channels (not shown) of system 1 or with the outside.

Figure 2:
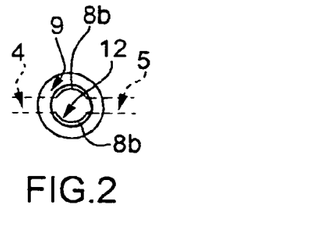
FIG. 2 is a top view of a detail of the system of FIG. 1 with parts removed for clarity.

Referring in particular to FIG. 2, side portions 8a are configured so as to define a broadening 12 of channel 2 in the area of hole 9. It should be noted that broadening 12 has a diameter smaller than the diameter of hole 9.

According to some embodiments, support 6 is made of silicon; covering 7 is made of glass; spacer element 8 is made of a photo-polymer (i.e. a photopolymerisable material).

According to other embodiments, support 6, covering 7 and spacer element 8 may be made of materials other than those indicated above.

Channel 2 has a section having an equivalent diameter from 10 µm to 0.5 mm. According to some embodiments, the section of channel 2 is substantially constant. Hole 9 has an equivalent diameter from 100 µm to 1 mm.

Advantageously, hole 9 has an equivalent diameter from 200 µm to 1 mm. According to some embodiments, hole 9 has a diameter smaller than 0.5 mm.

According to some embodiments hole 9 has a shape selected from the group consisting of: substantially frusto-conical, substantially frusto-pyramidal, substantially parallelepipedal, substantially cylindrical. Advantageously, holes 9 have a substantially cylindrical or substantially parallelepipedal shape (in particular substantially cylindrical).

According to some embodiments holes 10 and 11 have a shape selected from the group consisting of: substantially frusto-conical, substantially frusto-pyramidal, substantially parallelepipedal, substantially cylindrical. Advantageously, holes 10 and 11 have a substantially cylindrical or substantially parallelepipedal shape (in particular substantially cylindrical).

Figure 22:
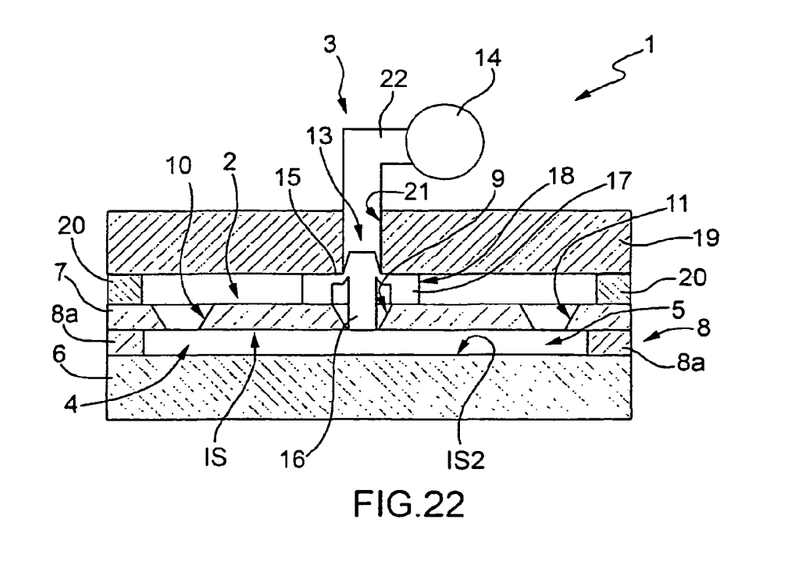
FIG. 22 shows the system of FIG. 1 in a different operative position.

Valve 3 includes a closing element 13 comprising (in particular, consisting of), in turn, a substantially elastic material (in particular, an elastomer); and an actuator 14, which is adapted to displace closing element 13 from a locked position (shown in FIG. 1) and an open position (shown in FIG. 22). According to some embodiments, closing element 13 may consist of a single elastomeric material (i.e. an elastomer) or by a combination (for example a mixture) of several different elastomeric materials.

According to the embodiment shown, actuator 14 is a fluid-dynamic actuator (in particular a pneumatic actuator). Advantageously, in these cases, actuator 11 comprises a suction system, specifically a pump.

According to some embodiments, actuator 14 is a mechanical actuator, which is adapted, when operated, to (draw and/or) push closing element 13 by means of a piston (not shown) in the locking position.

Closing element 13 comprises a membrane portion 15 and a closing portion 16 which projects from membrane portion 15 so as to extend (at least partially) in (through) hole 9 (within channel 2). In other words, closing element 13 (more precisely, closing portion 16) engages hole 9 (at least partially, but advantageously totally).

Closing portion 16 isolates first and second segment 4 and 5 from one another. In particular, when closing element 13 is in the locked position, closing portion 16 isolates segment 4 and 5 from one another. According to some embodiments, when closing element 13 is in the locked position, closing portion 16 isolates segment 4 and 5 from one another.

For greater clarity (even though this is apparent from a careful reading of the present text), it should be noted that by "an element (or a portion etc.) isolates segments 4 and 5 from one another" there is intended that such an element (or portion etc.) determines a reduction (the conditions being the same, in particular the speed of the fluid being the same) of the flow rate of the fluid (in particular, the liquid) between segments 4 and 5 with respect to the flow rate of fluid between segments 4 and 5 when closing element 13 is in the open position. As previously indicated, in some cases (i.e. for some embodiments) the reduction is such as to isolate segments 4 and 5.

In some cases, the reduction in flow rate is obtained by reducing the area of the passage section through which the fluid passes between segments 4 and 5.

Figure 3:
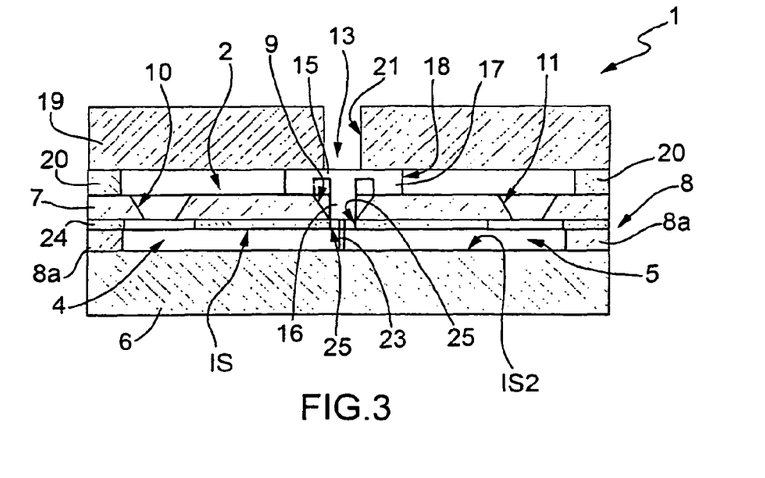
FIG. 3 is a diagrammatic, cross section with parts removed for clarity of another embodiment of a micro-fluidic system made according to the present invention.

According to the embodiments shown in FIGS. 1-3, when closing element 13 is in the locked position, closing portion 16 extends within channel 2 (in particular, until it comes into contact with wall 6).

More precisely, closing portion 16 completely engages broadening 12, when closing element 13 is in the locked position. According to some variants, the dimensions of closing portion 16 are greater than the dimensions of housing 12. Therefore, when closing element 13 is in the locked position, closing portion 16 is deformed (in particular compressed) so as to sealingly separate segment 4 and segment 5. In practice, in some cases, segments 4 and 5 are isolated when closing element 13 is in the locked position and closing portion 16 is deformed.

Advantageously, broadening 12 and closing portion 16 have complementary shapes.

Membrane 15 is arranged on the opposite side of hole 9 (more precisely of covering 7) with respect to channel 2.

Advantageously, when no force is exerted on closing element 13, closing element 13 is in the locked position. More specifically, in these cases, closing portion 16 isolates segments 4 and 5 from one another. In other words, (when not in use) closing portion 16 isolates segments 4 and 5 from one another.

According to some embodiments, closing portion 16 have a shape selected from the group consisting of: substantially frusto-conical, substantially frusto-pyramidal, substantially parallelepipedal, substantially cylindrical. Advantageously, closing portion 16 has a substantially cylindrical or substantially parallelepipedal shape (in particular substantially cylindrical).

Closing element 13 further comprises a projection 17 extending along peripheral edge 18 of membrane portion 15. In other words, closing element 13 has a greater thickness at peripheral edge 18. This allows to improve the sealing between closing element 13 and covering 7. Projection 17 has an annular shape.

It should be noted that closing portion 16 is spaced from projection 17. In particular, closing portion 16 is arranged substantially at the centre of membrane portion 15.

Figure 21:
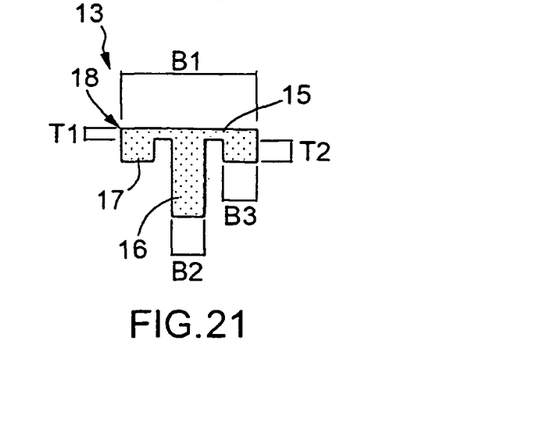
FIG. 21 shows a closing element made according to the present invention.

Referring in particular to FIG. 21, membrane portion 15 has a width B1 from 700 μm to 2 mm and a thickness T1 from 100 μm to 200 μm; closing portion 16 has a width B2 from 100 μm to 1000 μm, advantageously from 200 μm to 1000 μm; projection 17 has a thickness T2 from 10 μm to 500 μm and a width B3 from 200 μm to 500 μm.

The dimensions indicated in the present text may be measured in a standard manner with profilometers.

According to some embodiments, the width B2 is smaller than the equivalent diameter of hole 9.

According to specific embodiments, membrane portion 15 and closing portion 16 have a substantially cylindrical shape; in this case projection 17 has the shape of a circular ring and widths B1 and B2 correspond to the diameter of the end surfaces of membrane portion 15 and of closing portion 16, respectively.

Advantageously, the elastomer comprises (in particular consists of) a silicone, in particular a silicone rubber. According to some embodiments, the silicone has the following formula:

wherein n is an integer greater than 4, each R is selected, independently of the others, from the group consisting of: methyl, ethyl, propyl.

According to some embodiments the elastomer comprises (i.e. consists of) only one silicone or, alternatively, several different silicones.

Advantageously, the elastomer has an elastic modulus from 750 KPa to 2500 KPa.

System 1 further comprises a fastening element 19, which is connected substantially integral to covering 7. In the embodiment shown in FIG. 1, fastening element 19 is connected to covering 7 by means of one or more adhesive spacers 20.

A part of membrane portion 15, in particular the peripheral part (specifically in the area of projection 17), is clamped between fastening element 19 and covering 7 so that closing element 13 correctly maintains its position at hole 9.

Fastening element 19 further comprises an opening 21, which is arranged at (in particular above) hole 9 and is adapted to connect closing element 13 with actuator 14 through a duct 22 (diagrammatically shown).

According to some embodiments (not shown), fastening element 19 comprises openings arranged in the area of holes 10 and 11.

Figures 4, 5, 6A, 6B, 6C:
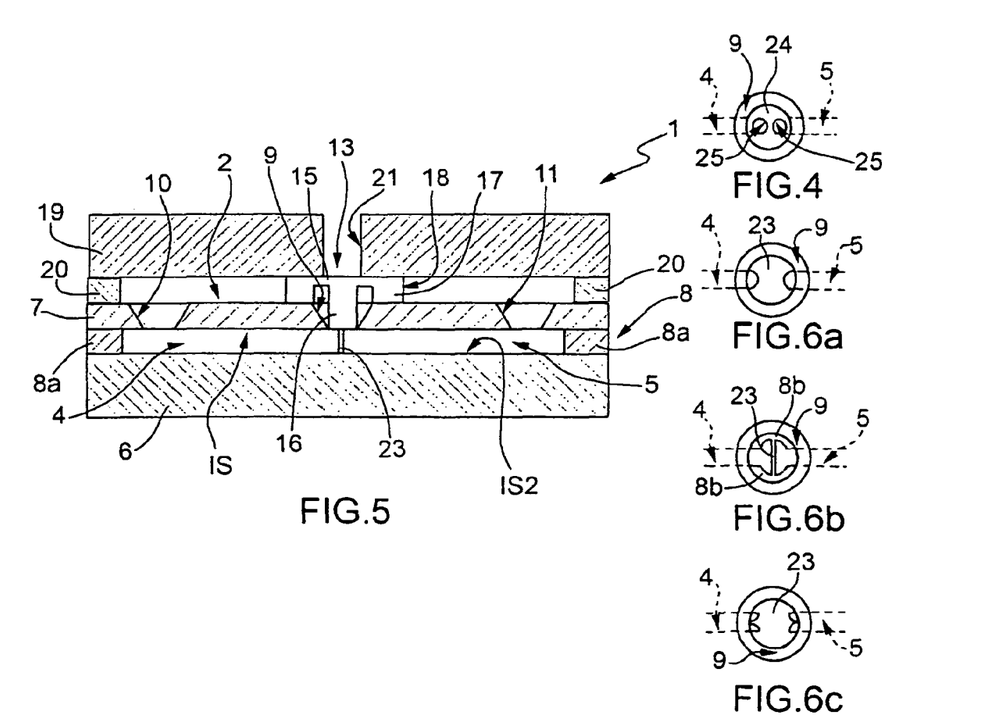
FIG. 4 is a top view of a detail of the system of FIG. 3 with parts removed for clarity.
FIG. 5 is a diagrammatic, cross section with parts removed for clarity of another embodiment of a micro-fluidic system made according to the present invention.
FIGS. 6a, 6b and 6c are each a top view of respective and different embodiments of a detail of the system of FIG. 5.

Micro-fluidic system 1 shown in FIG. 5 is substantially identical to system 1 shown in FIG. 1 and differs only by comprising a partition 23, which is arranged within channel 2 between segments 4 and 5. Partition 23 is adapted to separate segments 4 and 5 from one another. FIGS. 6a, 6b and 6c show three different shapes of partition. 23. In each of these cases, when closing element 13 is in a locked position, closing portion 16 is adapted to cooperate with (in particular is in contact with) partition 23 to sealingly isolate segment 4 with respect to segment 5. In particular, in the locked position, closing element 16 is adapted to close on top the open ends of segments 4 and 5. When closing element 13 is in the open position, partition 23 and closing portion 16 are spaced from one another, the fluid (in particular, the liquid) passes from segment 4 to segment 5 (or vice versa) "overcoming" partition 23.

In particular, partition 12 separates segments 4 and 5. Partition 12 projects from inner surface IS2 (in particular, towards hole 9).

Micro-fluidic system 1 shown in FIGS. 3 and 4 is substantially identical to system 1 shown in FIG. 5 and differs only in that covering 7 comprises another layer 24, which is sealingly connected to partition 23, and has two openings 25 which are smaller than hole 9. When closing element 13 is in the locked position, closing portion 16 is in contact with layer 24 (engages hole 9) and seals openings 25 avoiding the transfer of fluid between segments 4 and 5. When closing element 13 is in the open position, closing portion 16 is spaced from layer 24 and the fluid (in particular the liquid) passes through openings 25 above layer 24 (and, in particular, below closing portion 16).

Inner surface IS (in these cases) is substantially coplanar to openings 25.

It should be noted than openings 25 are (also) openings of hole 9 towards channel 2.

It should be noted that the embodiment shown in FIGS. 3 and 4 and especially advantageous as it allows a sealing isolation between segments 4 and 5 in an especially efficient manner.

According to some embodiments, layer 24 is photo-polymer.

It should also be noted that in virtue of the presence of closing element 13, actuator 14 must be operated (so as to create a depression) only when valve 3 is to be opened and segments 4 and 5 are to be connected. In other words, when actuator 14 does not apply a pressure nor a depression on closing element 13, closing element 13 is in a closed position. This determines relevant advantages in terms of simplicity of actuator 14, wear reduction and energy consumption.

System 1 according to the present invention may advantageously be used in an apparatus for separating particles as an example disclosed in one of the following Italian patent applications and patent applications claiming the priority thereof: BO2009A000152, BO2009A000153, BO2009A000154, BO2009A000155.

Unless explicitly indicated otherwise, the content of the references (papers, texts, patent applications etc.) cited in this text is herein incorporated by way of completeness of description. In particular, the above mentioned references are herein incorporated by reference.

Further features of the present invention will result from the following disclosure of some embodiments of microfluidic system 1 given by mere way of non-limitative illustration.

EXAMPLE 1

This example discloses the implementation of closing element 13.

Closing element 13 was made of PDMS (polydimethylsiloxane) (Sylgard 184® of Dow Corning—it should be noted that other materials may be used).

Figure 18:
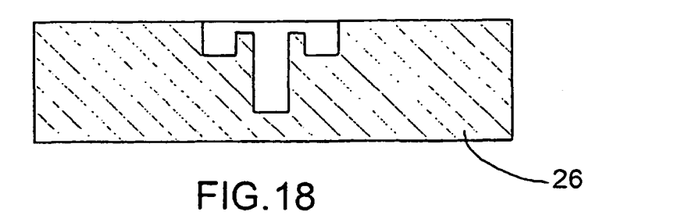
Figure 19:
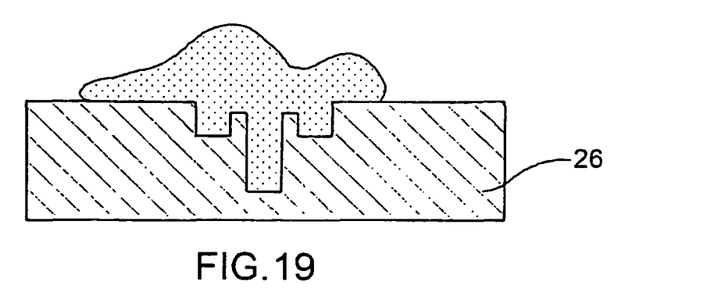
Figure 20:
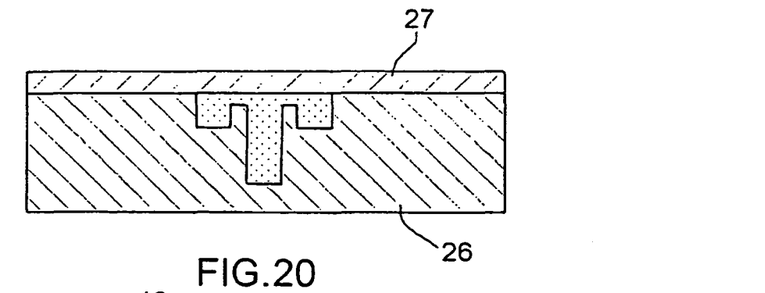

The hardening agent of PDMS (tetra methyl tetravinyl cyclotetrasiloxane) and the base were mixed in a ratio of 1:10 and the mixture obtained thereby was poured in a mould (FIGS. 18 and 19) which reproduces the shape of closing element 13 in negative. PDMS was degassed in a vacuum chamber for one hour. A lid 27 was arranged on mould 26 to remove PDMS in excess. Covered mould 26 was inserted in an oven for 2 hours at a temperature of 80° C. Closing element 13 was then extracted from mould 26 by using a cutter (FIG. 21).

EXAMPLE 2

This example discloses the implementation of micro-fluidic system 1 shown in FIGS. 1 and 2.

Figure 7:
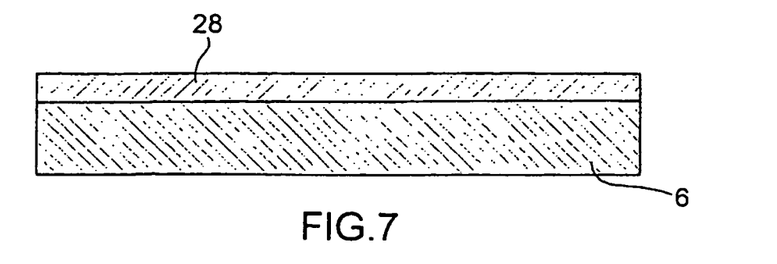
FIGS. 7 to 20 diagrammatically show a cross section of some embodiments of the micro-fluidic systems of FIGS. 1 and 3.
Figure 8:
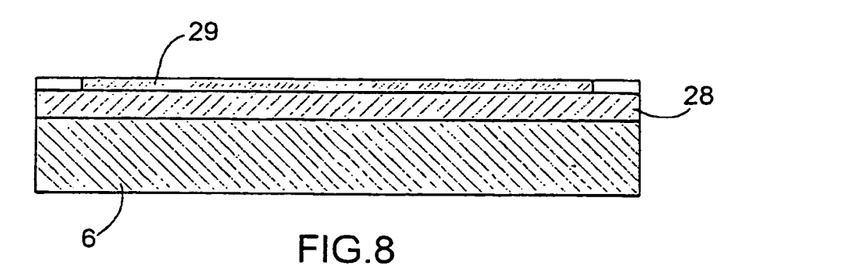

A layer 28 of photo-polymer (Dryresist in particular Ordyl SY300, Elga Europe) (thickness 90 μm) was laminated at a 90° angle on support 6 of silicon (FIG. 7) (thickness 600 μm). Layer 28 was therefore partially protected by a photolithographic mask 29 (a transparent slide printed with a resolution of 24000 DPI) (FIG. 8) and subjected to UV radiation (150 W) for 15 seconds so that the areas of layer 28 which are exposed (i.e. not covered by the dark parts of the mask) polymerise. Once polymerisation was selectively performed, the non polymerised part was removed by dipping laminated substrate 6 in a developer (BMR developer—mixture of xylene, 2-butoxyethylacetate, mixture of isomers).

Figure 9:
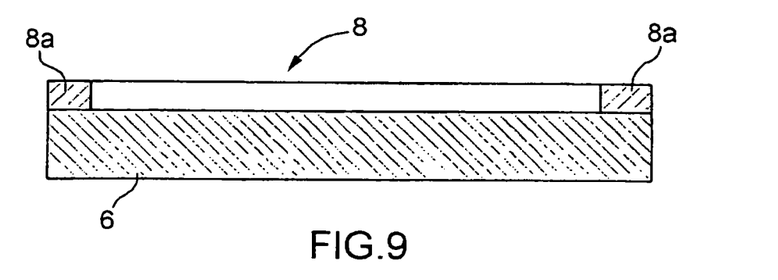

At this point, substrate 6 with corresponding spacer element 8 obtained thereby (FIG. 9) was heated in an oven at a temperature of 50° C. for 1 hour to obtain drying.

Figure 10:
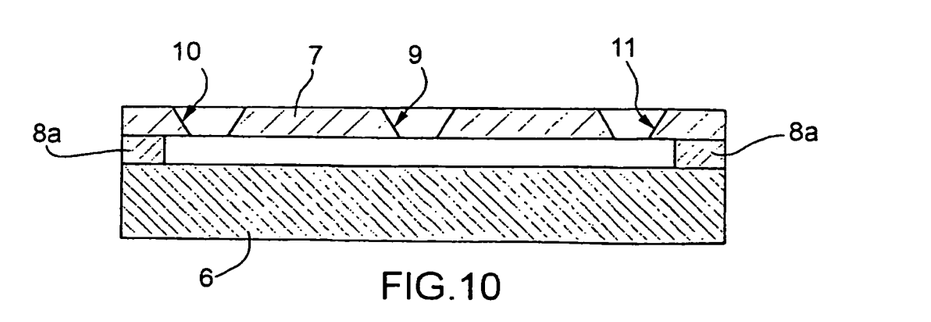

Covering 7 (of glass) (thickness 500 μm) was obtained by milling. Holes 9, 10 and 11 had a frusto-conical shape with the bottom part having a diameter of 700 μm and the top part having a diameter of 1200 μm.

Covering 7 (FIG. 10) was pressed against spacer element 8 for 80 minutes at a temperature of 95° C. to obtain a thermal bond.

At this point, closing element 13 obtained in example 1 was aligned and inserted in hole 9.

Finally, adhesives 20 were aligned and arranged on covering 7. Having done this, covering 7 was aligned so that the hole of this covering was arranged concentrically to the membrane and was pressed on the adhesive for a few minutes.

EXAMPLE 3

This example discloses the implementation of micro-fluidic system 1 shown in FIGS. 3 and 4.

Figure 11:
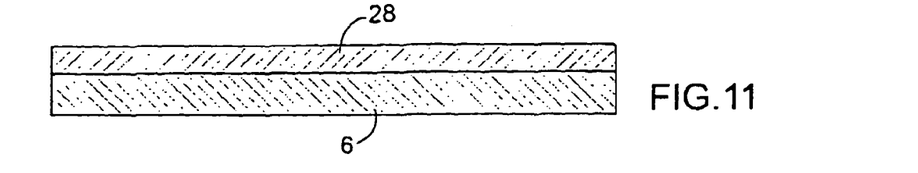
Figure 12:
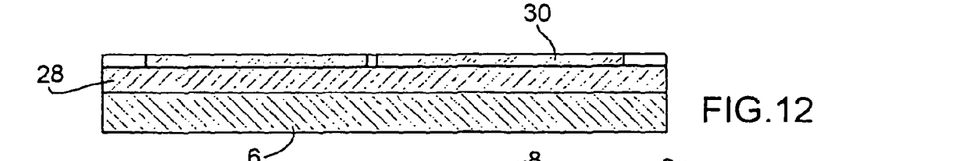

A layer 28 of photo-polymer (Dryresist in particular Ordyl SY300, Elga Europe) (thickness 90 μm) was laminated at a 90° angle on support 6 of silicon (FIG. 11) (thickness 600 μm). Layer 28 was therefore partially protected by a photo-lithographic mask 30 (a transparent slide printed with a resolution of 24000 DPI) (FIG. 12) and subjected to UV radiation (150 W) for 15 seconds so that the areas of layer 28 which are exposed (i.e. not covered by the dark parts of the mask) polymerise. Once polymerisation was selectively performed, the non polymerised part was removed by dipping laminated substrate 6 in a developer (BMR developer—mixture of xylene, 2-butoxyethylacetate, mixture of isomers).

At this point, substrate 6 with corresponding spacer element 8 and partition 23 obtained thereby (FIG. 13) were heated in an oven at a temperature of 50° C. for 1 hour to obtain drying.

Figure 13:
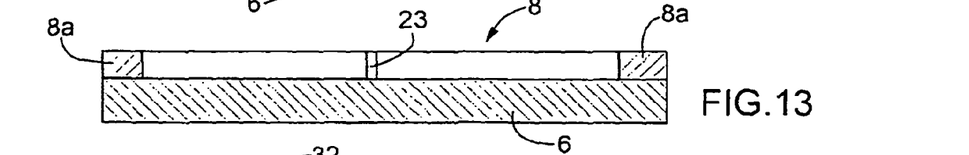

A glass layer 31 of covering 7 (thickness 500 μm) was obtained by milling. Holes 9, 10 and 11 had a frusto-conical shape with the bottom part having a diameter of 700 μm and the top part having a diameter of 1200 μm.

Figure 14:
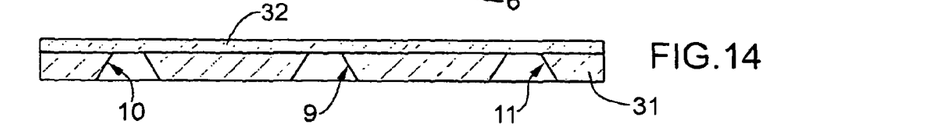

A layer 32 of photo-polymer (Dryresist in particular Ordyl SY300, Elga Europe) (thickness 30 μm) was laminated at a 90° angle on the above mentioned glass layer (FIG. 14).

Figure 15:
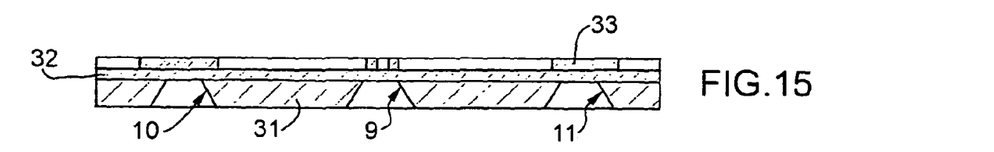
Figure 16:
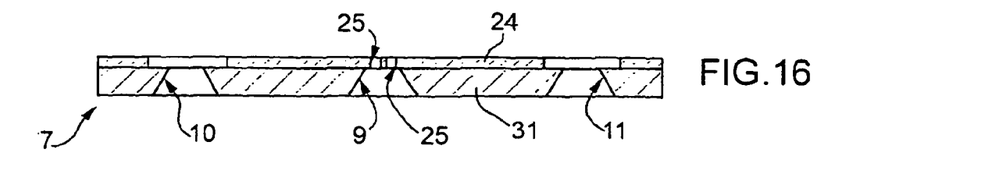

Layer 32 was therefore partially protected by a photolithographic mask 33 (a transparent slide printed with a resolution of 24000 DPI) (FIG. 15) and subjected to UV radiation (150 W) for 15 seconds so that the areas of layer 32 which are exposed (i.e. not covered by the dark parts of the mask) polymerise. Once polymerisation was selectively performed, the non polymerised part was removed (FIG. 16) by dipping covering 7 in a developer (BMR developer—mixture of xylene, 2-butoxyethylacetate, mixture of isomers).

Figure 17:
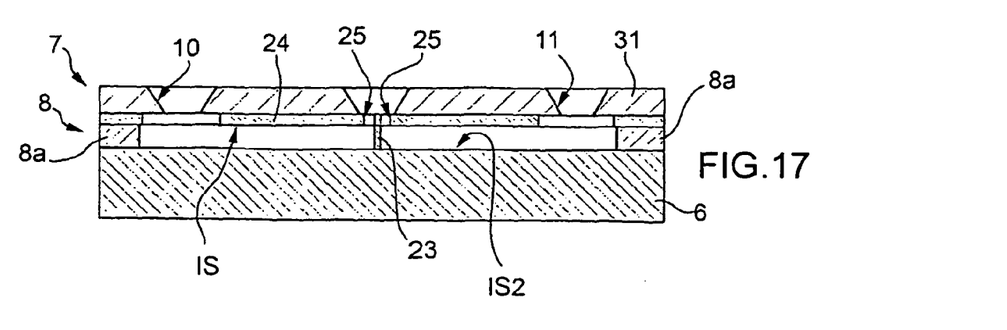

Covering 7 (FIG. 17) was pressed against spacer element 8 for 80 minutes at a temperature of 95° C. to obtain a thermal bond.

At this point, closing element 13 prepared according to example 1 was aligned and inserted in hole 9.

Finally, adhesives 20 were aligned and arranged on covering 7. Having done this, covering 7 was aligned so that the hole of this covering was arranged concentrically to the membrane and was pressed on the adhesive for a few minutes.

The invention claimed is:

1. A micro-fluidic system comprising:
at least one micro-fluidic channel wherein the microfluidic channel is substantially linear and comprises a first inner surface and an opposed second inner surface, a first segment, at least one second segment collinear with the first segment, and at least one wall, wherein the at least one wall is provided with at least one hole arranged between the first and second segments; and
at least one valve, which is arranged along the at least one micro-fluidic channel in the area of the hole, wherein the at least one valve comprises an actuator and a closing element comprising at least one substantially elastic material,
wherein:
the actuator is adapted to displace the closing element between an open position, in which the first and second segments communicate with one another, and a locked position, in which the closing element isolates the first and second segments from one another;
the first and second inner surfaces each extends downstream and upstream of the at least one valve so as to at least partially define the microfluidic channel in the area of the first and second segments;
the portion of the first inner surface in the area of the first segment is substantially coplanar to the portion of the first inner surface in the area of the second segment,
the portion of the second inner surface in the area of the first segment is substantially coplanar to the portion of the second inner surface in the area of the second segment;
the closing element comprises a membrane portion and a closing portion, which projects from the membrane portion so as to at least partially engage said hole and isolate the first and second segments;
the closing element is in the locked position without any force exerted on the closing element; and
the actuator is adapted to displace the closing element from the locked position to the open position.

2. The system according to claim 1, wherein the closing element has a projection extending along a peripheral edge of the membrane portion.

3. The system according to claim 2, wherein the closing portion is spaced from the projection, and is arranged substantially at the center of the membrane portion.

4. The system according to claim 1, wherein the closing portion has a shape selected from the group consisting of: substantially frusto-conical, substantially frusto-pyramidal, substantially parallelepipedal, substantially cylindrical.

5. The system according to claim 1, comprising at least one fastening element, which is connected to said wall; at least one part of the membrane portion of the closing element being clamped between the fastening element and the wall; the fastening element being provided with at least one opening arranged at said hole to connect the actuator to the closing element.

6. The system according to claim 1, comprising a partition arranged within the micro-fluidic channel, between the first and second segments.

7. The system according to claim 6, wherein the partition separates the first and second segments; the partition projects from a second inner surface towards the hole.

8. The system according to claim 7, wherein said wall of the micro-fluidic channel has at least two openings; the at least two openings being arranged on opposite sides of the partition, which separates the first and second segments from one another.

9. The system according to claim 1, wherein the micro-fluidic channel has a section with an equivalent diameter smaller than 0.5 mm and in particular greater than 10 µm.

10. The system according to claim 1, wherein the hole has an equivalent diameter smaller than 1 mm, and greater than 100 µm.

11. The system according to claim 1, wherein the hole has an equivalent diameter greater than 200 µm.

12. The system according to claim 1, wherein the at least one substantially elastic material comprises a silicone.

13. The system according to claim 12, wherein the silicone has the following formula:

$$[R_2SiO]_n$$

wherein n is an integer greater than 4, each R is selected, independently of the others, from the group consisting of: methyl, ethyl, propyl.

14. The system according to claim 1, wherein the closing element consists of at least one elastomer.

15. The system according to claim 14, wherein the elastomer has an elastic modulus from 750 KPa to 2500 KPa.

16. The system according to claim 1, wherein the membrane portion has a width from 700 µm to 2 mm and a thickness from 100 µm to 200 µm; the closing portion has a width from 100 µm to 1000 µm, in particular from 200 µm to 1000 µm.

17. The system according to claim 16, wherein the closing element has a projection, extending along a peripheral edge of the membrane portion and has a thickness from 10 µm to 500 µm and a width from 200 µm to 500 µm.

18. The system according to claim 1, wherein the actuator is a pneumatic actuator.

19. The system according to claim 1, wherein the membrane portion of the closing element is arranged on the opposite side of the hole with respect to the channel.

20. The system according to claim 1, wherein the closing portion isolates said first and second segments from one another.

21. The system according to claim 1, wherein said hole has at least one opening facing the channel; the first inner surface extending substantially coplanar to the opening of the hole facing towards the channel.

22. A closing element for a micro-fluidic system having a micro-fluidic channel, comprising:
a membrane portion;
a closing portion, which projects from the membrane portion and is adapted to at least partially engage at least one hole arranged between a first segment and at least one second segment of a micro-fluidic channel;
a projection projecting from the membrane portion parallel to the closing portion,
wherein:
at least a portion of the closing element is formed from at least one substantially elastic material, and
the closing element is displaceable between an open position, in which the first and second segments of the micro-fluidic channel communicate with one another, and a locked position, in which the closing element isolates the first and second segments of the micro-fluidic channel from one another, and the closing element is configured to be in the locked position without any force exerted on the closing element.

23. The closing element according to claim 22, wherein the membrane portion has a width from 700 µm to 2 mm and a thickness from 100 µm to 200 µm; the closing portion has a width from 100 µm to 1000 µm.

24. The closing element of claim 23, wherein the closing portion has a width from 200 µm to 1000 µm.

25. The closing element according to claim 22, wherein the projection has a thickness from 10 µm to 500 µm and a width from 200 µm to 500 µm.

26. The closing element of claim 22, wherein the at least one substantially elastic material is an elastomer.

27. The system of claim 1, wherein the at least one substantially elastic material is an elastomer.

28. The system of claim 12, wherein the silicon is a silicon rubber.

29. The system of claim 1, wherein the at least one wall is further provided with at least one first opening arranged at the first segment, and at least one second opening arranged at the second segment.

* * * * *